United States Patent Office 3,216,972
Patented Nov. 9, 1965

3,216,972
PRODUCTION OF HIGH MOLECULAR WEIGHT POLYMERS OF FORMALDEHYDE
Henri Sidi, Paramus, N.J., assignor, by mesne assignments, to Tenneco Chemicals, Inc., a corporation of Delaware
No Drawing. Filed Sept. 20, 1962, Ser. No. 225,113
5 Claims. (Cl. 260—67)

This application is a continuation-in-part of copending patent application Serial No. 133,783, which was filed on August 25, 1961.

This invention relates to a process for the production of tough, high molecular weight polymers of formaldehyde. More particularly it relates to the use of metal complexes as polymerization initiators in the preparation of these polymers of formaldehyde.

The polymerization of monomeric formaldehyde to high molecular weight polymers is known in the art, and several processes have been developed using various initiators. This invention provides a process using a new and different class of polymerization initiators.

It is an object of this invention to provide a new and useful process for the polymerization of monomeric formaldehyde to high molecular weight, normally solid polyoxymethylene. A further object of this invention is to provide a new class of initiators for the polymerization of monomeric formaldehyde to high molecular weight polyoxymethylene. Other objects will appear hereinafter.

The objects of this invention may be accomplished by contacting substantially anhydrous monomeric formaldehyde with a polymerization initiator which is a metal complex and recovering the high molecular weight polyoxymethylene formed thereby.

The metal complexes that may be used in this process to initiate the polymerization of formaldehyde are chelates of the polyvalent metals having atomic numbers between 28 and 50. These metals include nickel, copper, zinc, strontium, zirconium, molybdenum, palladium, cadmium, indium, and tin. The preferred polymerization initiators are copper, nickel, and tin chelates.

The choice of the chelating agent that is used in the preparation of the polymerization initiators is not critical. A wide variety of well-known chelating agents may be used for this purpose. These include, for example, 8-hydroxyquinoline; dicarboxylic acids such as malonic acid, alkylmalonic acids, oxalic acid, succinic acid, itaconic acid, and citraconic acid; amines such as ethylene diamine, N,N-dialkylethylenediamines, diethylenetriamine, triethylenetetramine, propylene diamine, bipyridyl, and o-phenanthroline; amino acids such as glycine, glutamic acid, phenylalanine, ethylenediamine tetraacetic acid, and ethylenediamine dipropionic acid; salicylaldehyde and its derivatives; oximes such as benzoinoxime and dimethylglyoxime; and the like. A single metal chelate or a mixture of two or more of these compounds may be used in the practice of the present invention.

The metal chelates may be prepared by methods that are well-known in the art. For example, the 8-quinolinolates may be prepared by reacting the appropriate metal halide with 8-hydroxyquinoline under alkaline conditions.

The amount of the metal chelate that is used in the polymerization of formaldehyde is not critical. In most cases approximately 0.0001 part to 0.5 part and preferably 0.001 part to 0.5 part by weight of the initiator is used per part by weight of formaldehyde. The metal chelate may be used as such in the polymerization reaction, or it may be added as a solution of the chelate in a solvent, such as mineral spirits, benzene, or toluene.

The polymerization reaction may be carried out in the presence of a liquid reaction medium or as a vapor phase reaction. It is preferably carried out in a substantially anhydrous organic medium which remains liquid under the conditions chosen for the reaction, which is inert to formaldehyde and to the polymerization initiator, and which is a non-solvent for polyoxymethylene at the temperature at which the polymerization is carried out. Suitable reaction media include hydrocarbons containing 3 to 10 carbon atoms per molecule such as propane, hexane, decane, cyclohexane, xylene, and decahydronaphthalene, as well as hydrocarbon halides, ethers and esters. The amount of the reaction medium used is generally within the range of approximately 1 to 1000 parts and preferably 1 to 100 parts by weight per part by weight of formaldehyde.

The polymerization may be carried out by introducing anhydrous monomeric formaldehyde into a reactor containing the reaction medium and the polymerization initiator. Alternatively, formaldehyde may be introduced continuously into a reactor containing the reaction medium while at the same time the polymerization initiator is added at such a rate that the temperature is maintained with the range chosen for the reaction. When the polymerization is complete, the polyoxymethylene may be recovered and dried.

The formaldehyde monomer that is used as the starting material in the process of this invention may be derived from any convenient source. It may be obtained, for example, by the pyrolysis of paraformaldehyde, trioxane, α-polyoxymethylene, or a hemi-formal, such as cyclohexanol. In order that the desired tough, high molecular weight product be obtained, it is necessary that the monomeric formaldehyde be substantially anhydrous, that is, that it contain less than 0.5% and preferably less than 0.1% by weight of water.

The conditions under which the formaldehyde is polymerized are not critical. The polymerization is generally carried out at a temperature between approximately $-100°$ C. and $80°$ C. and preferably between $10°$ C. and $60°$ C. It is particularly preferred to effect the polymerization of formaldehyde at approximately $20°$ C. to $45°$ C. While subatmospheric and superatmospheric pressures may be employed, the polymerization in most cases takes place under atmospheric pressure.

The formation of tough, high molecular weight polyoxymethylene is best accomplished under non-oxidizing conditions. One way of obtaining such conditions involves sweeping the reactor with a dry inert gas, such as nitrogen, and then carrying out the polymerization under a blanket of the inert gas. In addition an antioxidant may be present in the reaction medium and/or may be added to the product to reduce oxidative effects. Among the antioxidants that may be used for this purpose are phenothiazine, 2 - mercaptobenzimidazole, diphenylamine, phenyl-α-naphthylamine, bis (β-naphthylamine)-p-phenylene diamine, 4,4'-butylidene bis (3-methyl-6-tert. butylphenol), and 5-ethyl-10,10-diphenylphenazasiline. The amount of antioxidant used is generally between approximately 0.01 part and about 1 part by weight per 100 parts by weight of formaldehyde.

In those cases in which it is desirable to control the molecular weight of the product, a small amount of a chain transfer agent may be added to the reaction mixture before or during the polymerization step. Suitable chain transfer agents include water; aliphatic alcohols, such as methanol, ethanol, and cyclohexanol; aliphatic acids and acid anhydrides, such as formic acid, acetic acid, butyric acid, acetic anhydride, and propionic anhydride; aromatic acids, such as benzoic acid and toluic acid; and esters, such as methyl acetate, methyl propionate, ethyl formate, and ethyl acetate.

In a preferred embodiment of the invention, the metal chelate polymerization initiators are used in a unified process in which monomeric formaldehyde is converted to stabilized polyoxymethylene without the isolation and purification of an intermediate unstabilized product. In this procedure anhydrous monomeric formaldehyde is introduced into a reactor that contains a metal chelate as the polymerization initiator and an alkylene dicarboxylate as the reaction medium and allowed to polymerize. The resulting suspension of high molecular weight polyoxymethylene in the alkylene dicarboxylate is then heated to form a thermally-stabilized product.

The use of a metal chelate as the polymerization initiator in the aforementioned unified process for the preparation of stabilized polyoxymethylene results in valuable improvements both in the polymerization process and in the properties of the product. When the previously known formaldehyde polymerization initiators, that is, aliphatic amines, polyamines, or organometallic compounds are used in this process, it is necessary to carry out the polymerization reaction at a temperature below approximately $-10°$ C. in order to obtain in good yield a product having a molecular weight of at least 20,000. When a metal chelate is used as the polymerization initiator, the polymerization may be accomplished at ambient temperatures without adversely affecting the yield of the product or its properties. When the polymerization is carried out at ambient temperatures rather than at temperatures below $-10°$ C., simpler and less expensive equipment may be used, and processing costs are appreciably reduced. In addition the compounds described herein as being useful as initiators for the polymerization of formaldehyde in an alkylene dicarboxylate reaction medium have been found to be less sensitive than other initiators to impurities in the reaction medium and to be capable of producing polymer at a high rate even though very small amounts of the initiator are used.

The use of the metal chelates in the polymerization of formaldehyde also results in an increase in the thermal stability of the esterified polyoxymethylene obtained by this procedure. This improvement is believed to be due in part to the fact that the small amount of the chelate remaining in the product acts as a heat stabilizer for the polymer. In addition the metal chelates, unlike the organometallic compounds and metal soaps that have previously been used as formaldehyde polymerization initiators, are not decomposed by the water used to wash the esterified polyoxymethylene to non-volatile compounds, such as the metal oxide or hydroxide, that have an adverse effect on the thermal stability of the product.

The alkylene dicarboxylates that may be used as the reaction medium in this process have the formula

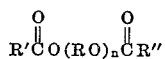

wherein R represents $CH_2$ or $CH(CH_3)$; R' and R'' each represents an alkyl group containing from 1 to 18 carbon atoms, a cycloalkyl group, or an aryl group; and $n$ represents a number in the range of 1 to 3. The preferred alkylene dicarboxylates are those in which R represents a methylene group and R' and R'' each represents an alkyl group containing from 1 to 3 carbon atoms, for example, methylene diacetate, methylene dipropionate, methylene dibutyrate, methylene acetate propionate, the low molecular weight polymeric analogs of these diesters, and mixtures thereof. Particularly preferred are methylene diacetate and mixtures containing approximately 50% to 90% of methylene diacetate and 10% to 50% of its dimeric and trimeric analogs.

The alkylene dicarboxylates may be prepared by any convenient procedure. For example, approximately equimolar amounts of paraformaldehyde and the appropriate monocarboxylic acid anhydride or a mixture of such anhydrides may be reacted in the presence of an acidic catalyst, for example, zinc chloride, sulfuric acid, or phosphoric acid, and the product isolated by fractional distillation. It is often advantageous to distill the diester prior to its use in the present process to insure the absence of monocarboxylic acids which may inhibit the polymerization.

Upon completion of the polymerization step, the reaction mixture, which comprises a suspension of high molecular weight polyoxymethylene in the alkylene dicarboxylate, is heated with stirring to a temperature at which the alkylene dicarboxylate will react with the terminal hydroxyl groups of the polyoxymethylene and maintained at that temperature until esterification of the hydroxyl groups is complete. While temperatures as low as approximately 100° C. may be used, the esterification reaction is preferably carried out at a temperature in the range of approximately 140° C. to 200° C. If desired, somewhat higher temperatures may be used. It is particularly preferred that the esterification reaction take place at a temperature in the range of approximately 150° C. to 180° C. At temperatures in the preferred range, a reaction period of approximately 5 minutes to 3 hours is generally required for the esterification.

The reaction between the polyoxymethylene and the alkylene dicarboxylate is preferably carried out in the presence of a catalytic amount of an alkaline esterification catalyst, which preferably is an alkali metal salt of an acid having a dissociation constant of less than $1.8 \times 10^{-4}$ at 25° C. These salts include, for example, sodium formate, sodium acetate, sodium laurate, sodium stearate, sodium benzoate, sodium salicylate, sodium carbonate, disodium phosphate, lithium acetate, lithium benzoate, potassium formate, potassium salicylate, potassium carbonate, and the like. The amount of the alkaline esterification catalyst that is used ordinarily varies from approximately 0.001% to 1%, and preferably from 0.01% to 0.1%, based on the weight of the alkylene dicarboxylate.

Following the esterification step, the thermally-stable polyoxymethylene is precipated by cooling the reaction mixture to room temperature and isolated, for example, by filtration.

It has been found advantageous to wash and dry the stabilized polyoxymethylene as thoroughly as possible or otherwise treat it to remove all of the reactants and reaction by-products that might cause degradation of the product. This purification may be accomplished by washing the polymer with water and organic solvents, such as ketones, ethers, and hydrocarbons, and drying the recovered polymer under vacuum.

The thermal stability of the esterified polyoxymethylene may be determined by measuring the weight loss that a one gram sample of the product undergoes on being heated at 222° C. for one hour. The stabilized polymers prepared in accordance with the process of this invention have a thermal degradation rate at this temperature of less than 15% per hour and preferably less than 10% per hour.

The inherent viscosities of the formaldehyde polymers may be taken as an indication of their molecular weights. These inherent viscosities are measured at 150° C. on solutions containing 0.5 part of polymer and 1 part of diphenylamine in 100 parts of dimethylformamide. The term "high molecular weight polyoxymethylene" as used herein refers to polyoxymethylene having an inherent viscosity at 150° C. of at least 0.30 and preferably at least 0.50 in dimethylformamide containing 1% of diphenylamine. Inherent viscosities of 0.30 and 0.50 under the aforementioned conditions correspond to average molecular weights of approximately 10,000 and 20,000, respectively.

The following examples will illustrate the manner in which the present invention may be practiced. It is to be understood, however, that these examples are not to be construed as being limitative, but are furnished merely for the purpose of illustration. Unless otherwise noted, all parts and percentages used herein refer to parts and percentages by weight.

Example 1

One hundred parts of α-polyoxymethylene was hydrolyzed, and the monomeric formaldehyde which was generated was continuously swept at atmospheric pressure with a slow stream of dry nitrogen through a series of traps, the first of which was maintained at room temperature, the second at 0° C., and the third and fourth at —15° to —22.5° C., and into a reaction vessel which contained 1500 parts of cyclohexane, 0.1 part of phenothiazine, and 0.1 part of a 10% solution of copper 8-quinolinolate in mineral spirits. The reaction mixture was stirred vigorously during the addition of the monomeric formaldehyde which took place over a period of 80 minutes. The polymerization was carried out at 25°–30° C. When the addition of formaldehyde had been completed, the reaction mixture was filtered. The solid product was washed with 300 parts of cyclohexane and dried under vacuum at 65° C. to constant weight. There was obtained 42.8 parts of polyoxymethylene which had an inherent viscosity of 2.57 at 0.5% concentration in dimethylformamide containing 1% of diphenylamine.

Example 2

One hundred parts of α-polyoxymethylene was hydrolyzed, and the monomeric formaldehyde which was generated was continuously swept at atmospheric pressure with a slow stream of dry nitrogen through a series of traps, the first of which was maintained at room temperature, the second at 0° C., and the third and fourth at —15° to —22.5° C., and into a reaction vessel which contained 1500 parts of benzene, 0.1 part of phenothiazine, and 0.1 part of stannous 8-quinolinolate. The addition of formaldehyde took place over a period of 80 minutes during which time the reaction mixture was stirred vigorously. The polymerization was carried out at 25°–30° C. When the polymerization has been completed, the reaction mixture was filtered. The solid product was washed with 300 parts of benzene and dried under vacuum at 65° C. to constant weight. There was obtained 70.8 parts of polyoxymethylene which had an inherent viscosity of 0.86 at 0.5% concentration in dimethylformamide containing 1% of diphenylamine.

Example 3

One hundred parts of α-polyoxymethylene was hydrolyzed, and the monomeric formaldehyde which was generated was continuously swept at atmospheric pressure with a slow stream of nitrogen through a series of traps, the first of which was maintained at room temperature, the second at 0° C., and the third and fourth at —21° to 25° to 30° C. Then 0.5 gram of anhydrous sodium ace- parts of freshly distilled methylene diacetate, 0.1 part of 4,4'-butylidene bis (6-tert.butyl-m-cresol), and 0.1 part of a 10% solution of copper 8-quinolinolate in mineral spirits. The addition of formaldehyde took place over a period of 63 minutes during which time the reaction mixture was stirred vigorously and maintained at 25° to 30° C. Then 0.5 gram of anhydrous sodium acetate was added to the reaction mixture. The mixture was stirred and heated gradually to 160°–170° C., maintained at that temperature for 1 hour, cooled to room temperature, and filtered. The crude product was washed with 500 parts of acetone, then with four 500 part portions of water, and finally with two additional 500 part portions of acetone, the second of which contained 0.1 part of 4,4'-butylidene bis (6-tert.butyl-m-cresol). The product was dried under vacuum at 65° C. to constant weight. There was obtained 36 parts of acetylated polyoxymethylene that had an inherent viscosity of 0.89 at 0.5% concentration in dimethylformamide containing 1% of diphenylamine and a thermal degradation rate at 222° C. of 4.5% per hour.

Example 4

The polymerization of formaldehyde using copper 8-quinolinolate as the polymerization initiator was carried out by the procedure described in Example 3. In this case, however, 0.1 part of powdered copper 8-quinolinolate was used as the initiator. There was obtained 29.8 parts of acetylated polyoxymethylene that had an inherent viscosity of 0.592 at 0.5% concentration in dimethyl formamide containing 1% of diphenylamine and a thermal degradation rate at 222° C. of 1.7% per hour.

Example 5

The polymerization of formaldehyde was carried out by the procedure described in Example 3. In this case, however, 0.1 part of powdered stannous 8-quinolinolate was used as the polymerization initiator. There was obtained 38.7 parts of acetylated polyoxymethylene that had an inherent viscosity of 1.054 at 0.5% concentration in dimethylformamide containing 1% of diphenylamine.

Example 6

The polymerization of formaldehyde was carried out by the procedure described in Example 3. In this case, however, 0.1 part of nickel dimethylglyoxime was used as the polymerization initiator. There was obtained 35.9 parts of acetylated polyoxymethylene that had an inherent viscosity of 1.054 at 0.5% concentration in dimethylformamide containing 1% of diphenylamine and a thermal degradation rate at 222° C. of 2% per hour.

Each of the other metal chelates that have been disclosed herein may be employed in a similar manner to initiate the polymerization of formaldehyde to form tough, high molecular weight polyoxymethylene.

Formaldehyde polymers prepared in accordance with this invention may be converted by melt extrusion, injection molding, compression molding, and other fabrication methods to shaped articles, such as fibers, films, rods, molded objects, and other articles having a high degree of toughness and other desirable and useful properties.

I claim:

1. The process for producing high molecular weight polymers of formaldehyde which comprises contacting substantially anhydrous monomeric formaldehyde with a reaction medium comprising (i) from about 1 to about 1000 parts by weight, per part of formaldehyde, of an alkylene dicarboxylate having a structure represented by the formula $$R'-\underset{\underset{O}{\|}}{C}-O-(RO)_n-\underset{\underset{O}{\|}}{C}-R''$$

in which R represents a divalent substituent selected from the group consisting of

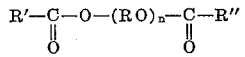
and
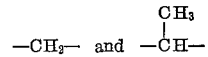

R' and R" each represent substituents selected from the group consisting of alkyl groups containing 1 to 18 carbon atoms, cycloalkyl groups, and aryl groups, and $n$ is an integer from 1 to 3, and (ii) from about 0.0001 to about 0.5 part by weight per part of formaldehyde, of a chelate of a polyvalent metal selected from the group consisting of nickel, copper, zinc, strontium, zirconium, molybdenum, palladium, cadmium, indium, and tin, at a temperature in the range from about 10° C. to about 60° C. under substantially anhydrous conditions, thereby forming a high molecular weight polymer of formaldehyde.

2. The process for producing thermally stable high molecular weight polymers of formaldehyde which comprises (a) contacting substantially anhydrous monomeric formaldehyde with a reaction medium comprising (i) from about 1 to about 1000 parts by weight, per part of formaldehyde, of methylene diacetate, and (ii) from about 0.001 to about 0.5 part by weight, per part of formaldehyde, of a chelate of a polyvalent metal selected from the group consisting of nickel, copper, zinc, strontium, zirconium, molybdenum, palladium, cadmium, indium, and tin, at a temperature in the range from about 10° C. to about 80° C. under substantially anhydrous conditions, thereby forming a suspension of a high molecular weight polymer of formaldehyde in methylene diacetate, (b) heating the resultant suspension to a temperature in the range from about 140° C. to about 200° C., thereby acetylating the high molecular weight polymer of formaldehyde and forming a thermally stable polyoxymethylene polyacetate, and (c) recovering the acetylated polymer from the reaction mixture.

3. The process for producing thermally stable high molecular weight polymers of formaldehyde according to claim 2, in which the chelate employed to initiate the polymerization reaction is a copper chelate having a ligand derived from a compound selected from the group consisting of 8-hydroxyquinoline, malonic acid, alkylmalonic acids, oxalic acid, succinic acid, itaconic acid, citraconic acid, ethylene diamine, N,N-dialkylethylenediamines, diethylenetriamine, triethylenetetramine, propylene diamine, bipyridyl, o-phenanthroline, glycine, glutamic acid, phenylalanine, ethylene diamine tetraacetic acid, ethylene diamine dipropionic acid, salicylaldehyde, benzoin-oxime, and dimethylglyoxime.

4. The process for producing thermally stable high molecular weight polymers of formaldehyde according to claim 2, in which the chelate employed to initiate the polymerization reaction is a tin chelate having a ligand derived from a compound selected from the group consisting of 8-hydroxyquinoline, malonic acid, alkylmalonic acids, oxalic acid, succinic acid, itaconic acid, citraconic acid, ethylene diamine, N,N-dialkylethylenediamines, diethylenetriamine, triethylenetetramine, propylene diamine, bipyridyl, o-phenanthroline, glycine, glutamic acid, phenylalanine, ethylene diamine tetraacetic acid, ethylene diamine dipropionic acid, salicylaldehyde, benzoinoxime, and dimethylglyoxime.

5. The process for producing thermally stable high molecular weight polymers of formaldehyde according to claim 2, in which the chelate employed to initiate the polymerization reaction is a nickel chelate having a ligand derived from a compound selected from the group consisting of 8-hydroxyquinoline, malonic acid, alkylmalonic acids, oxalic acid, succinic acid, itaconic acid, citraconic acid, ethylene diamine, N,N-dialkylethylenediamines, diethylenetriamine, triethylenetetramine, propylene diamine, bipyridyl, o-phenanthroline, glycine, glutamic acid, phenylalanine, ethylene diamine tetraacetic acid, ethylene diamine dipropionic acid, salicyaldehyde, benzoinoxime, and dimethylglyoxime.

References Cited by the Examiner
UNITED STATES PATENTS

| | | | |
|---|---|---|---|
| 3,046,251 | 7/62 | Wagner | 260—67 |
| 3,111,503 | 11/63 | O'Connor et al. | 260—67 |

OTHER REFERENCES

Martell et al.: Chemistry of Metal Chelate Compounds, p. 500, Prentice-Hall, Inc., N.Y.

WILLIAM H. SHORT, *Primary Examiner.*

UNITED STATES PATENT OFFICE

CERTIFICATE OF CORRECTION

Patent No. 3,216,972                      November 9, 1965

Henri Sidi

It is hereby certified that error appears in the above numbered patent requiring correction and that the said Letters Patent should read as corrected below.

Column 1, line 64, for "0.5" read -- 0.05 --; column 5, line 53, strike out "25° to 30° C. Then 0.5 gram of anhydrous sodium ace-" and insert instead -- -25° C., and into a reaction which contained 568.6 --; column 6, line 75, for "0.001" read -- 0.0001 --; column 8, line 19, for "salicyaldehyde" read -- salicylaldehyde --.

Signed and sealed this 27th day of September 1966.

SEAL)
Attest:

ERNEST W. SWIDER                           EDWARD J. BRENNER
Attesting Officer                                  Commissioner of Patents